June 20, 1967     A. HASBROUCK     3,326,722
FUEL CELL SEAL
Filed Dec. 27, 1962
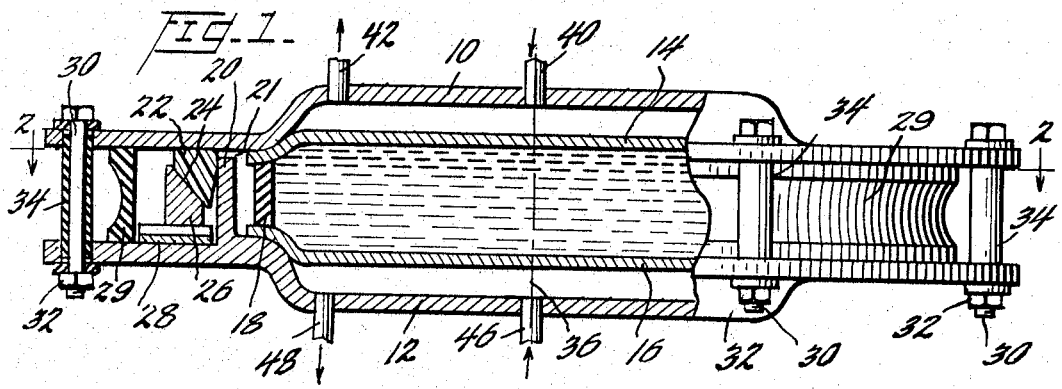
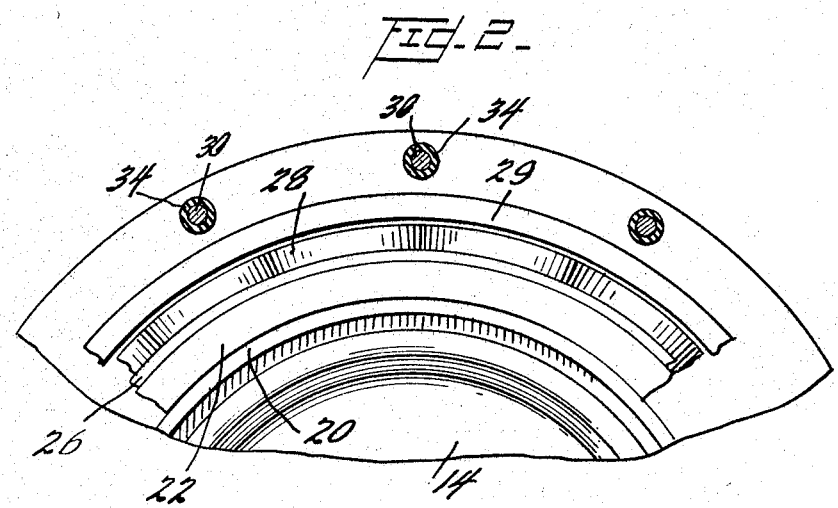
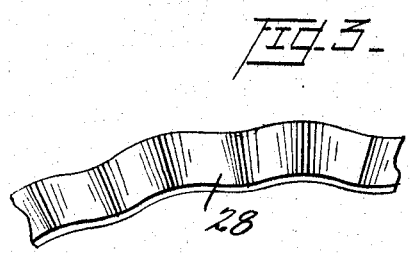
INVENTOR
Augustus Hasbrouck,
BY Watson, Cole, Grindle & Watson
ATTORNEYS United States Patent Office 3,326,722
Patented June 20, 1967

3,326,722
FUEL CELL SEAL
Augustus Hasbrouck, Middletown, Conn., assignor, by mesne assignments, to Leesona Corporation, Cranston, R.I., a corporation of Massachusetts
Filed Dec. 27, 1962, Ser. No. 247,577
5 Claims. (Cl. 136—86)

This invention relates to fuel cells and more particularly, to an improved seal therefor.

One of the principal problems in constructing fuel cells is that of providing suitable seals which will withstand the caustic electrolyte, such as potassium hydroxide which is usually at an elevated temperature of the order of 400–450° F. The sealing material commonly used for fuel cells is Teflon which is capable of withstanding the high temperature in a manner superior to other materials. In these known sealing arrangements, however, the caustic electrolyte slowly deteriorates that portion of the seal which it contacts. After extended use the caustic electrolyte eventually eats through the Teflon seal and leaks out of the container. One of the factors which aids this action is the elevated pressure of the electrolyte. This pressure may be of the order of 2 lbs. per square inch or, in extreme conditions, may be quite high, such as of the order of 50 or 60 lbs. per square inch. One of the disadvantages of known Teflon seals is that Teflon has a tendency to relax and cold-flow with time and temperature fluctuations, thereby greatly limiting its use. Further, Teflon exhibits plastic deformation as opposed to elasticity and thus, does not retain its initial shape as would a similar seal of rubber.

Accordingly, it is an object of this invention to provide an improved seal.

It is another object of this invention to provide an improved seal for a fuel cell which obviates the above disadvantages.

It is a still further object of this invention to provide a fuel cell seal which prevents leakage of the electrolyte over an extended period of time, even if a portion of the seal is eaten away by the caustic electrolyte.

Briefly, in accordance with aspects of this invention, I provide a fuel cell with a seal having a continuous following load provided by a spring device. Advantageously, the compressive load on the fuel cell is employed to force the fuel cell seal into a tight seating relationship at the gap between two elements of the fuel cell, such that a creeping of the sealing material causes it to creep in toward the electrolyte such that a tight seal is maintained even when a portion of the seal is eaten away by the electrolyte.

Advantageously, in one illustrative embodiment, the sealing ring is a continuous ring having a triangular or preferably trapezoidal cross section and is held by a combination of piston and spring adjacent the gap formed by two elements of the fuel cell. The spring and piston receive a force which is axial with respect to the fuel cell and this force is converted by means of the angularly positioned face of the piston and the cross section of the seal to a combination of axial and radial forces on the seal, thereby forcing the seal into the gap between the two elements.

These and various other objects and features of the invention will be more clearly understood from a reading of the detailed description of the invention in conjunction with the drawing in which:

FIG. 1 is a sectional view of a fuel cell unit in which all of the elements are circular and symmetrical with respect to the axis;

FIG. 2 is a partial plan view of the embodiment of FIG. 1; and

FIG. 3 is a fragmentary isometric view of spring member 28.

Referring now to the drawing, there is depicted a fuel cell assembly including covers 10 and 12. Between the covers 10 and 12 are a pair of electrodes 14 and 16 each having flanges which are supported by the respective covers. The electrodes are held in spaced relationship by means of a suitable insulating ring 18. Cover 12 has an inwardly extending flange 20 which extends to a region immediately adjacent the cover 10. This spacing is to provide an insulating gap 21 between the two covers and this gap may be of the order of .003 or .004 inch. The interior of the seal, that is the region between electrodes 14 and 16 and the region between these electrodes and the respective covers is filled with a suitable electrolyte. It is this electrolyte which must be prevented from escaping through the insulating gap defined between the flange 20 and the cover 10. The novel seating arrangement according to this invention comprises a ring 22 of Teflon or other suitable material which ring is continuous and preferably trapezoidal in cross section. Abutting the angular surface 24 of the ring 22 is a solid ring 26 which is preferably of metal and a relatively flat circular spring 28 between the cover 12 and the ring 26. The covers are held in spatial relationship by an annular insulating spacing ring 29. Covers 10 and 12 may be provided with suitable bolts for securing the cover together, such as bolt 30 which is secured by nut 32, which bolt is insulated from the covers by means of insulating ring 34. It is understood that this particular embodiment of fuel cell assembly is symmetrical about the axis 36. The region between electrode 14 and cover 10 is filled with a suitable gas which is supplied through gas port 40 and may be exhausted through another suitable gas port, such as port 42. Similarly, the region between cover 12 and electrode 16 is filled with the other gas through conduit 46 which other gas may be exhausted through an exhaust port such as port 48. The electrolyte may be similarly supplied and removed through suitable conduits, not shown. The electrodes may advantageously be of the biporous type and these electrodes may be connected in series of parallel to other groups of electrodes within the cover, it being understood that while only two electrodes are shown, a large number might be employed in a manner well known in the art.

During the course of operation of the cell the electrolyte attempts to pass through gap 21 between the extending flange 20 and the cover 10. However, because the spring 28 and the solid ring 26 effectively wedge the sealing ring 22 into gap 21, a good seal is produced and maintained even though the electrolyte eats away a portion of the ring 22. In other words, while the electrolyte might eat a portion of the ring 22, this portion is continually replaced because of the radial component of thrust exerted by members 26 and 28 on ring 22. The preferred material for ring 22 is Teflon and properties of this material are well known, for example, this material exhibits plastic deformation rather than elasticity. It is understood, however, that other materials might be employed if they exhibited elasticity or plastic deformation so long as they were capable of resisting the caustic electrolyte.

While I have shown and described one illustrative embodiment of this invention, it is understood that the concepts thereof may be implied to other embodiments without departing from the spirit and scope of this invention.

What is claimed is:

1. In a fuel cell assembly comprising a first and a second cover member having similar peripheral configurations, means maintaining said covers in spatial relationship, at least two electrodes in contact with said cover members defining gas chambers and an electrolyte chamber between said electrodes, said electrodes being electrically insulated from one another, the improvement wherein said second cover member has an extension thereon extending in the direction of the first cover member and terminating immediately adjacent said first cover member to provide an insulating gap between said cover members, a sealing ring engaging said extension and said first cover member to define a seal at said gap, a substantially trapezoidal metallic ring in contact with said sealing ring and having a surface in contact with said sealing ring which corresponds to the surface of longest dimension of said sealing ring and spring means positioned between said second cover member and said metallic ring to exert a thrust upon said metallic ring thereby forcing said sealing ring into said gap.

2. A fuel cell assembly comprising a first and a second cover member, means for maintaining said covers in spatial relationship, and at least two electrodes in contact with said cover members defining gas chambers, an electrolyte chamber between said electrodes, said electrodes being electrically insulated from one another, one of said cover members having an extension thereon which extends in the direction of the other cover member and terminates immediately adjacent said other cover member to define an insulating gap between said cover members, a sealing ring encircling said extension and positioned to contact said extension and said other cover member to define a fluid seal at said insulating gap and spring means comprising a spring and piston contacting said sealing ring to give both an axial and radial thrust upon said sealing ring whereby said sealing ring is forced into said insulating gap in response to the application of a radial thrust on said cover members.

3. A fuel cell assembly comprising a first and a second circular cover member, means maintaining said member in spatial relationship, an extension on said second cover member defining a ring and extending in the direction of the first cover member and terminating immediately adjacent said first cover member to define an insulating gap therebetween, a substantially trapezoidal cross-sectioned annular sealing ring encircling said extension and contacting said first cover member and said extension and spring means for exerting radial thrust upon said annular ring in response to the application of an axial thrust on said cover members and means for applying an axial thrust to said cover members.

4. A fuel cell assembly according to claim 3, wherein said annular ring has a substantially trapezoidal cross section with its longest surface facing said sealing ring.

5. A fuel cell assembly according to claim 4, wherein said spring means includes a metallic ring having a substantially trapezoidal cross section with its longest surface in contact with said sealing ring and a relatively flat undulated annular spring positioned between said second cover member and said metallic ring.

No references cited.

WINSTON A. DOUGLAS, *Primary Examiner.*

H. FEELEY, *Assistant Examiner.*